Patented July 17, 1951

2,561,209

UNITED STATES PATENT OFFICE 2,561,209

HYDROGENATED DICYCLOPENTADIENE INSECTICIDE

Allen R. Kittleson, Cranford, and Louis A. Mikeska, Westfield, N. J., assignors to Standard Oil Development Company, a corporation of Delaware No Drawing. Application December 30, 1947, Serial No. 794,786

5 Claims. (Cl. 167—30)

This invention relates to new and useful improvements in insecticidal preparations. This invention also relates to methods of protecting organic material subject to attack by low orders of organisms.

It has now been found that hydrogenated, polychlorinated polycyclopentadienes, and especially the hydrogenated, polychlorinated dicyclopentadienes, are extremely effective for killing and repelling insects.

These compounds are especially effective against destructive chewing insects such as the Mexican bean beetle, the Colorado potato beetle and caterpillars. Since the compositions of these inventions are non-phytotoxic, they may be applied directly to a wide variety of plants to protect them from injurious insects.

The hydrogenated polychlorinated dicyclopentadienes are viscous oils soluble in acetone, alcohol, benzene and other common hydrocarbon solvents.

These compounds may be adsorbed on a solid carrier such as clay, talc and bentonite to be applied as a diluted dust. They may also be applied as a spray in a liquid carrier either as a solution in a solvent or as a suspension in a nonsolvent such as water. When applied as a spray in water, it may be desirable to incorporate wetting agents such as sodium lauryl sulfate, alkaryl sulfonates, various soaps and other sulfated and sulfonated preparations. They may also be admixed with carriers that are themselves active such as parasiticides, hormones, herbicides, fertilizers and wetting agents, stomach and contact insecticides such as the arsenates, fluorides, rotenone and the various fish poisons and organic insecticides such as dichloro-diphenyl trichlorethane. Benzene-hexachloride and similar products may also be advantageously added.

The compounds of this invention are prepared by hydrogenating dicyclopentadiene and then chlorinating the hydrogenated product. It is necessary that one double bond be hydrogenated to convert the dicyclopentadiene to the cyclic monoolefin in order to prevent polymerization in the subsequent chlorination step. The dicyclopentadiene may be further hydrogenated so that it is completely saturated prior to chlorination, but no increase in insecticidal activity is attained thereby. Thus an equimolar reaction between hydrogen and dicyclopentadiene produces a product satisfactory for the subsequent chlorination. The hydrogenation may be carried out at atmospheric or higher hydrogen pressures using the usual hydrogenation catalysts. Whenever the term "hydrogenated dicyclopentadiene" is used hereafter, it is to be understood that this refers to dicyclopentadiene which has had at least one of its two unsaturated bonds hydrogenated, as previously explained.

The hydrogenated dicyclopentadiene may be chlorinated in the presence or absence of a solvent. Suitable solvents for the chlorination are chloroform, carbon tetrachloride etc. The initial stages of the chlorination, particularly when starting with dihydrodicyclopentadiene, may be carried out at room temperature or lower. To attain a more rapid rate of reaction at the higher chlorine content levels, elevated temperatures are desirable. A chlorination catalyst may be used if desired. Ultra-violet light is particularly efficient. A chlorine content of from 50 to 75% chlorine based on weight of the chlorinated product has been found to give the greatest insecticidal activity. This activity diminishes as the chlorine content becomes less than 50% or more than 75%.

It is indicated that the hydrogenation treatment prior to the chlorination, besides preventing polymerization, selectively orients the subsequent addition and substitutions of the chlorine atoms. This is illustrated by the fact that when HCl addition products of dicyclopentadiene were chlorinated to the same overall chlorine level as the compounds of this invention, the products obtained had distinctly less insecticidal activity than the compounds of this invention. The compositions obtained by the HCl addition and subsequent chlorination are different from those obtained by hydrogenation and chlorination.

The following examples will further illustrate the preparation of the compounds of this invention and tests on their uses for the stated purposes.

EXAMPLE I

Dicyclopentadiene was hydrogenated at room temperature in a Parr hydrogenation bomb using platinum oxide catalyst and a hydrogen pressure (gauge) of 20–40 lb./sq. in. The hydrogenated product was a waxy crystalline solid having an iodine number of 177 indicating that it was primarily dihydrodicyclopentadiene.

Solid hydrogenated dicyclopentadiene (136 g.) was charged to a 500 cc. 3-necked quartz flask equipped with a thermometer, stirrer, inlet tube for chlorine and a reflux condenser. The solid was liquified by heating and chlorine was passed into the agitated liquid starting at 60° C. The temperature rapidly increased to 90° C. as a result of the heat of reaction. The temperature was maintained, by occasional cooling, at 90–95° C. for 1¾ hours after which the temperature slowly decreased without external cooling. At the end of 3¼ hours the temperature had decreased to 58° C. The reaction mixture was then exposed to ultra-violet illumination and the chlorination continued at a temperature of 90–100° C. Samples were removed at the end of 10, 16½ and 23 hours, containing 63.0% (A), 68.3% (B) and 71.1% (C) chlorine respectively.

EXAMPLE II

The hydrogenated dicyclopentadiene used in this reaction had an iodine number of 6 indicating that it was primarily tetrahydrodicyclopentadiene.

The chlorination was carried out in a manner similar to Example I. Samples were removed at the end of 13, 17 and 24 hours and contained 62.8% (D), 66.5% (E) and 70.2% (F) chlorine respectively.

EXAMPLE III

The insecticidal activity of the various before designated products is given in the table below.

The values given under Contact Insecticidal Activity represent the mortality of the test insect after 96 hours following a 2-minute immersion in an 0.25% aqueous suspension or dispersion of the test compound.

Results of the Bloodstream Insecticidal Activity are given as per cent mortality after 96 hours following bloodstream injection of 0.5 mg. of the test compound per gram of insect body weight.

The Housefly Toxicity (Nelson Drop Test) gives the per cent mortality 24 hours following application of 0.002 cc. of the specified concentration of the test material on the fly's body.

Table I

| Product | Contact Insecticidal Activity (Per Cent Kill) | | Bloodstream Insecticidal Activity (Per Cent Kill), Periplanitus americana (American Roach) | | Housefly Toxicity, Nelson Drop Test | |
|---|---|---|---|---|---|---|
| | Blattella germanica (German Roach) | Omelpeltus sociatus (Milkweed Bug) | Female | Male | Conc. of Test cpd. Per Cent | Per Cent Kill |
| A | 100 | 100 | 100 | 100 | 0.01 | 95 |
| B | 100 | 100 | 100 | 100 | 0.01 | 95 |
| C | 100 | 100 | 100 | 100 | 0.05 | 70 |
| | | | | | 0.025 | 20 |
| D | 100 | 100 | 100 | 100 | 0.01 | 100 |
| E | 100 | 100 | 100 | 100 | 0.01 | 100 |
| F | 100 | 100 | 100 | 100 | 0.01 | 70 |

EXAMPLE IV a. *Residual activity against house flies*

These tests were conducted by spraying the inner surfaces of a glass cubical cage (with removable sides) and leaving the sprayed sides exposed to the air for seven days. The cage was then reassembled and houseflies placed in the cages. The dead flies were counted at the end of 24 hours.

*Residual test against house flies*

| Material | Concentration of Spray | Time Lapse | Per Cent Mortality in 24 hours |
|---|---|---|---|
| | *Per cent* | *Days* | |
| Product E | 0.5 | 7 | 100 |
| | 0.25 | 7 | 100 |
| | 0.125 | 7 | 30 |

EXAMPLE V

One sample of potato leaf was sprayed with lead arsenate, another sample with para dichlorodiphenyl trichloroethane and a third sample with product E. All three of these insecticides were used in equal concentrations. The leaves were then exposed to the action of Colorado potato beetles. The sample sprayed with product E suffered much less injury from the beetles than did the samples sprayed with the other two ingredients.

This invention has been described with respect to specific embodiments, but it is not to be limited thereby except as indicated in the appended claims.

What is claimed is:

1. A method of preparing a polychloro tetrahydrodicyclopentadiene containing from 50 to 75% by weight of chlorine which comprises completely hydrogenating dicyclopentadiene in the presence of a hydrogenation catalyst and chlorinating the resulting tetrahydrodicyclopentadiene with elemental chlorine to substitute chlorine atoms for hydrogen atoms to the indicated chlorine range in the presence of ultra-violet light at a temperature in the range of 0° to 100° C., whereby a chlorinated, saturated unpolymerized product is obtained.

2. A method as in claim 1 in which the hydrogenation catalyst is platinum oxide.

3. An insecticidal composition comprising a polychloro tetrahydrodicyclopentadiene containing from 50 to 75% by weight of chlorine, said product being obtained by completely hydrogenating dicyclopentadiene in the presence of a hydrogenation catalyst, followed by chlorinating the hydrogenated product with elemental chlorine to substitute chlorine atoms for hydrogen atoms to the indicated chlorine range in the presence of ultra-violet light at a temperature in the range of 0° to 100° C., admixed with a dispersing agent which lowers the surface tension of water and thereby promotes aqueous colloidal emulsions of the polychloro tetrahydrodicyclopentadiene.

4. An insecticidal dust composition comprising a polychloro tetrahydrodicyclopentadiene containing from 50 to 75% by weight of chlorine, said product being obtained by completely hydrogenating dicyclopentadiene in the presence of a hydrogenation catalyst, followed by chlorinating the hydrogenated product with elemental chlorine to substitute chlorine atoms for hydrogen atoms, admixed with a powdered clay.

5. An insecticidal dust composition as in claim 4 in which the clay is bentonite.

ALLEN R. KITTLESON.
LOUIS A. MIKESKA.

REFERENCES CITED

The following references are of record in the file of this patent:

UNITED STATES PATENTS

| Number | Name | Date |
|---|---|---|
| 2,010,841 | Bender | Aug. 13, 1935 |
| 2,382,038 | Bruson | Aug. 14, 1945 |

OTHER REFERENCES

Bruson, "Jour. Amer. Chem. Soc.," vol. 67, pages 1178–80 (1945).

"Chemical Abstracts," vol. 36, col. 6400 (1942), abstract of article by Foresti.

Roscoe, "Annalen der Chemie," vol. 232, page 349 (1886).

Kraemer et al., "Ber. der. Deutsche Chem. Gesell.," vol. 29, pp. 558–559 (1896).

Kearns, J. Economic Entomology, vol. 38 (1945), pages 661–669.